United States Patent [19]

Wijnen

[11] Patent Number: 5,101,275
[45] Date of Patent: Mar. 31, 1992

[54] VIDEO CAMERA WITH AUTOMATIC INTENSITY CONTROL

[75] Inventor: Arie M. Wijnen, Holargos, Greece

[73] Assignee: Copyguard Enterprises S.A., Luxembourg

[21] Appl. No.: 474,010

[22] PCT Filed: Aug. 23, 1989

[86] PCT No.: PCT/EP89/01010
§ 371 Date: Jun. 12, 1990
§ 102(e) Date: Jun. 12, 1990

[87] PCT Pub. No.: WO90/02464
PCT Pub. Date: Mar. 8, 1990

[30] Foreign Application Priority Data

Aug. 23, 1988 [NL] Netherlands ............... 8802082

[51] Int. Cl.⁵ ............ H04N 5/30; H04N 5/235; H04N 3/14; H04N 5/335
[52] U.S. Cl. ................ 358/209; 358/219; 358/213.19
[58] Field of Search ........... 358/209, 219, 228, 213.19, 358/217

[56] References Cited

U.S. PATENT DOCUMENTS

| | | |
|---|---|---|
| 2,786,960 | 3/1957 | Palmer et al. |
| 3,102,924 | 10/1963 | Legler ............... 358/219 |
| 3,315,034 | 4/1967 | White ............... 358/219 |
| 3,392,236 | 7/1968 | Nielsen et al. ............... 358/219 |
| 3,612,762 | 10/1971 | Wuellner . |
| 3,691,302 | 10/1972 | Gaebele et al. ............... 358/219 |
| 3,919,472 | 11/1975 | Dorsey et al. . |
| 4,214,272 | 7/1980 | Hapgood . |
| 4,833,536 | 5/1989 | Okino et al. ............... 358/209 |
| 4,839,569 | 6/1989 | Dallin, II ............... 358/219 |

FOREIGN PATENT DOCUMENTS 0141012 5/1985 European Pat. Off. .
2119007 11/1972 Fed. Rep. of Germany .

*Primary Examiner*—Howard W. Britton
*Assistant Examiner*—Wendy R. Greening
*Attorney, Agent, or Firm*—Larson and Taylor

[57] ABSTRACT

A video camera system provides automatic intensity control and includes an imaging system and an image transducing apparatus having an entry window which is image line scanned and on which images of pictures to be taken are formed by the imaging system. The image transducing apparatus transforms these images into electrical output signals which are converted by an amplitude to frequency converter into control signals of corresponding frequency. An external variable transmittance light control element, which is disposed in the light path containing the imaging system and the image transducing apparatus, is responsive to the control signals and, based thereon, influences the image formed on said entry window in such a manner that the sensitivity of a subsequent, closely following image point in a image scan line during the image line scanning is decreased when there is a large rapid increase in the amplitude of the electrical output signal and is increased when there is a large rapid decrease in the amplitude of the electrical output signal.

6 Claims, 1 Drawing Sheet

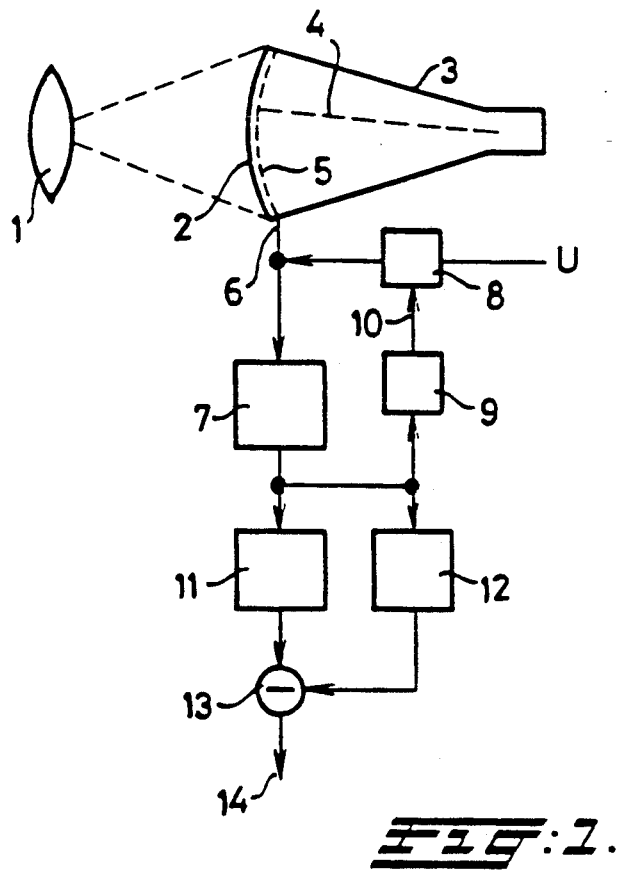
FIG:1.
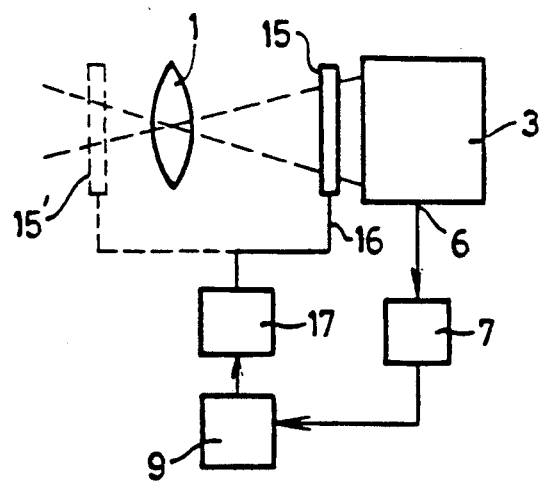
FIG:2.

5,101,275

VIDEO CAMERA WITH AUTOMATIC INTENSITY CONTROL

FIELD OF THE INVENTION

The invention relates to a video camera provided with an imaging system and an image transducing apparatus having an entry window, on which images of the pictures to be taken can be formed by this system, and is adapted to transform said images into electrical signals delivered to an output connection.

BACKGROUND OF THE INVENTION

In the current video cameras an iris diaphragm in the optical system is used for adapting the light intensity of the image formed on the entry window, which diaphragm is controlled by means of a control system responsive to the light intensity in such a manner that a substantially constant average light intensity is maintained.

Such a camera has several draw-backs. A first drawback is that the mechanical control of the diaphragm has a given inertia, so that a lag in the light intensity control arises, which, particularly in the case of fast light changes, e.g. with a fast camera movement from light to dark and vice versa, will lead an objectionable image transition. A second draw-back is that such a control acts on the whole image, so that in the case of large light contrasts and depending on the manner of intensity measurement, some image regions will be over- or underexposed, with, as a consequence, reproduction losses in the image parts of these regions.

Although, for the first draw-back, possibly a solution might be found by increasing the speed of the diaphragm drive, there is no solution for the second objection in the case of a diaphragm-type light control.

SUMMARY OF THE INVENTION

It is an object of the invention to provide a camera of the above-mentioned kind, by means of which these objections can be avoided. To that end the camera according to the invention is characterized in that the amplitude of the image signal derived from the signal output and corresponding with the light intensity of an image portion is transformed into a control signal for a control means for an additional image influencing element which, synchronously with the image line scanning, can influence the image signal in such a manner that the sensitivity in the image point in question during the image scanning is decreased at a large amplitude and is increased at a small amplitude.

Since, now, the sensitivity in any image point, or at least in groups of closely adjacent image points, can be adapted to the local light intensity, large light contrasts can be levelled or smoothed out and a good reproduction of the image portions can be obtained in the very bright and dark image portions.

The control should, of course, be so that not all the light contrasts will be suppressed, but only an adaptation to transitions in the light intensity will be obtained.

In a video camera with a transducer tube with electron beam scanning and a common electrode arranged behind the image window, the connection of which is, at the same time, the signal output, the voltage at this electrode can be controlled, according to the invention, in correspondence with the amplitude of the image signal during scanning.

It also possible, and in particular in so-called CCD transducers, to obtain such a control by arranging, in the light path to the transducer, i.e., between the imaging system and the transducer, a liquid crystal element or similar light control element, to which a HF voltage can be applied, the frequency thereof, and, thus, the transmittance of said element, being controlled in correspondence with the scanning.

Sometimes high intensity peaks will remain which cannot be completely suppressed by this control. In order to suppress also these peaks, it is possible, according to the invention, to send the image signal, if required after a preamplification, towards a threshold circuit which only passes the signal portions exceeding the chosen threshold, which portions, if required after adaptation of the amplitude thereof, will be subtracted from the original image signal in order to reduce the brighter portions accordingly, and, in particular, before said threshold circuit an inverter can be provided, so that, then, the output signals of the threshold circuit can be directly added to the image signal.

BRIEF DESCRIPTION OF THE DRAWINGS

The invention will be elucidated in more detail by reference to a drawing, in which FIGS. 1 and 2 show two embodiments of the video camera according to the invention with associated electric circuits in a highly simplified schematic way.

DESCRIPTION OF THE PREFERRED EMBODIMENTS

The camera according to FIG. 1 comprises an optical image forming system 1 forming images of the pictures to be taken on an entry window 2 of a video picture tube, which screen 2 is provided, in the usual manner, with a light sensitive layer which, under the influence of irradiation, can produce photoelectrons which, when scanning said layer by an electron beam 4, will influence the intensity of the electron current accordingly. The current modulated in this manner is collected by a collecting electrode 5 on this screen, which gives rise to an image signal at a signal output terminal 6 connected with said electrode 5. The signal derived from the terminal 6 is sent to a pre-amplifier 7 for a further processing.

A DC voltage applied to the electrode 5 having a suitable magnitude (and polarity) in respect of the cathode of the tube 3 ensures the collection of the beam 4, which voltage is adjustable by means of an adjustment circuit or voltage control circuit 8. In the known camera tubes of this kind the voltage at the terminal 6 is not changed further after a suitable adjustment thereof.

According to the invention, the amplitude of the signal derived from the terminal 6 is (in particular after a pre-amplification thereof in the amplifier 7) constantly determined in a measuring stage 9, which, in particular, is adapted to detect a sudden and considerable variation in the amplitude level of the image signal. This measuring stage 9 produces, when detecting such a variation, a control signal which is supplied to a control input 10 of the voltage control circuit 8, and this in such a manner that, at a sudden and large brightness increase or decrease, the voltage U at the electrode 5 is changed in the sense of a sensitivity decrease or increase respectively.

Such a change can be detected very quickly, so that within a very small number of image points of an image line a sensitivity adaptation can already be obtained This has as a consequence that nowhere in the picture over- or underexposure will take place, and that as well in the very bright as in the very dark image portions a good reproduction of the image portions will be obtained.

This is especially clearly visible in the case that the image shows a sharp transition between bright and dark portions. This control appears to work so fast that, while a clear brightest contrast is maintained, the reproduction of the image portions at both sides of the shadow boundary is excellent. This is especially also the case during movement of the camera from bright to dark portions and vice versa.

With the current cameras with diaphragm control this is not possible. In the first case, dependent on the manner of light measurement, the reproduction of the image elements in the bright or dark portions will be very poor, or, in the case of an adjustment on the average, will be insufficient in both portions. In the second case it will take some time before the diaphragm has been adjusted on the new condition, and, in the meantime, a poor image reproduction will be obtained.

Of course the voltage control by means of the stages 8 and 9 should be so that normal brightness contrasts in the image will not be suppressed. At an over-all satisfactory adjustment it can occur that, in particular in the very bright image portions, the reproduction of finer image elements will be insufficient. In order to improve this additional circuit elements are used which are diagrammatically shown in the drawing.

The output of the amplifier 7 is connected with the input of an amplifying stage 11, which can be a part of a current image signal amplifier, and, at the same time, with an auxiliary stage 12 which is adapted to amplify the same signal by a desired factor and, at the same time, will subject it to a threshold operation in which only those signal portions which exceed the threshold will be passed. The outputs of the stages 11 and 12 are connected with the inputs of a subtracting stage 13 in which the normal image signal at the output of the amplifier 11 is decreased by the signal portions passed by the stage 12. The image signal thus obtained appears at the output 14 of the latter stage 13, and is supplied to subsequent circuit elements of the current type.

Instead of using a subtracting stage 13, it is also possible to use an inverting stage for the signal supplied to the circuit 12, after which the output signals of the stages 11 and 12 can be added as such.

FIG. 2 shows a modified embodiment which is, in particular, suitable for use in a CCD camera comprising a special image cell matrix in which charges collected in the various image points can be shifted to output registers, but this embodiment can also be used in an image tube according to FIG. 1.

Between the image forming system 1 and the image transducer 3, which is, in particular, a CCD transducer but can also be an electron-beam tube according to FIG. 1, a liquid-crystal plate 15 is provided having a control electrode 16 which is connected with a frequency generator 17. The transmittance of this plate depends, for instance, on the frequency of the applied voltage.

The frequency of the generator 17 can be controlled, and, to that end, the output voltage of the stage 9 of FIG. 1 can be applied to the control input 18 thereof, this in such a manner that a control of the above-mentioned kind will be obtained.

It will be clear that instead of a liquid-crystal plate, light transmittance can be controlled by means of an electric signal.

It will be clear that the element 15, as shown in FIG. 2 interrupted lines at 15', can also be arranged before the image forming system 1. Moreover it will be clear that this element can not only be constructed as a separate element, but can also be integrated in a suitable way into the system 1 or the image transducer 3.

I claim:

1. A video camera system with automatic intensity control and including a light path in which are disposed an imaging system and an image transducing apparatus having an entry window which is scanned by image line scanning and on which images of pictures to be taken are formed by said imaging system, said image transducing apparatus transforming said images into electrical output signals, said video camera system further comprising control means for converting the amplitude of a said electrical output signal from said image transducing apparatus and corresponding to the light intensity of a portion of the image received from the imaging system, into a corresponding control signal, and an external variable transmittance light control element, also disposed in said light path, for, responsive to said control signal and in synchronism with the image line scanning, influencing the image formed on said entry window in such a manner that the sensitivity of a subsequent, closely following image point in an image scan line during the image line scanning is decreased when there is a large rapid increase in the amplitude of said electrical output signal and is increased when there is a large rapid decrease in the amplitude of said electrical output signal.

2. The video camera system of claim 1 further comprising a threshold circuit for passing only those portions of said output signal having an amplitude exceeding a predetermined threshold.

3. The video camera system of claim 1 wherein said light control element comprises a liquid crystal element.

4. The video camera of claim 3 wherein said liquid crystal element comprises a liquid crystal plate the transmittance of which varies with the frequency of the voltage applied thereto, and wherein said control means comprises a frequency generator connected to said liquid crystal plate for producing a control signal having a frequency based on the change of amplitude of said electrical output signal.

5. The video camera system of claim 1 wherein said control means includes an amplifier stage and a measuring stage for detecting any large, rapid variations in the amplitude of the output of said amplifier stage.

6. A video camera system with automatic intensity control and including a light path in which are disposed an imaging system and an image transducing apparatus having an entry window which is scanned by image line scanning and on which images of pictures to be taken are formed by said imaging system, said image transducing apparatus transforming said images into electrical output signals, said video camera system further comprising an amplitude to frequency converter means for converting the amplitude of a said electrical output signal from said image transducing apparatus and corresponding to the light intensity of a portion of the image received from the imaging system, into a control signal of corresponding frequency, and an external variable transmittance light control element, also disposed in said light path, for, responsive to said control signal and in synchronism with the image line scanning, influencing the image formed on said entry window in such a manner that the sensitivity of a subsequent, closely following image point in an image scan line during the image line scanning is decreased when there is a large rapid increase in the amplitude of said electrical output signal and is increased when there is a large rapid decrease in the amplitude of said electrical output signal.

* * * * *